United States Patent [19]
Nesheim et al.

[11] Patent Number: 5,897,664
[45] Date of Patent: Apr. 27, 1999

[54] MULTIPROCESSOR SYSTEM HAVING MAPPING TABLE IN EACH NODE TO MAP GLOBAL PHYSICAL ADDRESSES TO LOCAL PHYSICAL ADDRESSES OF PAGE COPIES

[75] Inventors: William A. Nesheim, Windham, N.H.; Aleksandr Guzovskiy, Lowell, Mass.

[73] Assignee: Sun Microsystems, Inc., Palo Alto, Calif.

[21] Appl. No.: 08/673,043

[22] Filed: Jul. 1, 1996

[51] Int. Cl.⁶ ................................................ G06F 12/10
[52] U.S. Cl. ........................................... 711/206; 711/147
[58] Field of Search ................................ 711/147, 148, 711/206, 207, 208

[56] References Cited

U.S. PATENT DOCUMENTS

| | | | |
|---|---|---|---|
| 5,117,350 | 5/1992 | Parrish et al. ................................. | 711/1 |
| 5,247,629 | 9/1993 | Casamatta et al. ....................... | 711/206 |
| 5,274,789 | 12/1993 | Costa et al. ............................. | 711/206 |
| 5,361,340 | 11/1994 | Kelly et al. .................................. | 711/3 |
| 5,592,625 | 1/1997 | Sandberg ................................. | 711/147 |
| 5,649,141 | 7/1997 | Yamazaki .................................. | 711/206 |
| 5,710,907 | 1/1998 | Hagersten et al. ....................... | 711/148 |

OTHER PUBLICATIONS

Hagersten, Erik et al. "DDM—A Cache–Only Memory Architecture". Swedish Institute of Computer Science. IEEE. 1992.

*Primary Examiner*—Eddie P. Chan
*Assistant Examiner*—Kevin Verbrugge
*Attorney, Agent, or Firm*—William J. Kubida; James A. Pinto; Holland & Hart LLP

[57] ABSTRACT

In a multiprocessor computing system, virtual memory addresses are mapped to local physical memory addresses of an attraction memory, containing a replication of the data contained at remote physical addresses, in a node of the system. A mapping table is created and maintained in each node of the system to supplement a conventional page table. The mapping table is used to map a global physical address to a local physical address of the replicated page of memory. System performance is enhanced by subsequent access to the data stored at the local physical address, as opposed to the remote physical address.

3 Claims, 7 Drawing Sheets

MULTIPROCESSOR SYSTEM HAVING MAPPING TABLE IN EACH NODE TO MAP GLOBAL PHYSICAL ADDRESSES TO LOCAL PHYSICAL ADDRESSES OF PAGE COPIES

CROSS REFERENCE TO RELATED APPLICATIONS

This patent application is related to the following co-pending, commonly assigned patent applications, the disclosures of which are incorporated herein by reference in their entirety:

1. "Extending The Coherence Domain Beyond A Computer System Bus" by Hagersten et al., filed concurrently herewith.
2. "Method And Apparatus Optimizing Global Data Replies In A Computer System" by Hagersten, filed concurrently herewith.
3. "Method And Apparatus Providing Short Latency Round-Robin Arbitration For Access To A Shared Resource" by Hagersten et al., filed concurrently herewith.
4. "Implementing Snooping On A Split-Transaction Computer System Bus" by Singhal et al., filed concurrently herewith.
5. "Split Transaction Snooping Bus Protocol" by Singhal et al., filed concurrently herewith.
6. "Interconnection Subsystem For A Multiprocessor Computer System With A Small Number of Processors Using A Switching Arrangement Of Limited Degree" by Heller et al., filed concurrently herewith.
7. "System And Method For Performing Deadlock Free Message Transfer In Cyclic Multi-Hop Digital Computer Network" by Wade et al., filed concurrently herewith.
8. "Synchronization System And Method For Plesiochronous Signaling" by Cassiday et al., filed concurrently herewith.
9. "Methods And Apparatus For A Coherence Transformer For Connecting Computer System Coherence Domains" by Hagersten et al., filed concurrently herewith.
10. "Methods And Apparatus For A Coherence Transformer With Limited Memory For Connecting Computer System Coherence Domains" by Hagersten et al., filed concurrently herewith.
11. "Methods And Apparatus For Sharing Stored Data Objects In A Computer System" by Hagersten et al., filed concurrently herewith.
12. "Methods And Apparatus For A Directory-Less Memory Access Protocol In A Distributed Shared Memory Computer System" by Hagersten et al., filed concurrently herewith.
13. "Hybrid Memory Access Protocol In A Distributed Shared Memory Computer System" by Hagersten et al., filed concurrently herewith.
14. "Methods And Apparatus For Substantially Memory-Less Coherence Transformer For Connecting Computer System Coherence Domains" by Hagersten et al., filed concurrently herewith.
15. "A Multiprocessing System Including An Enhanced Blocking Mechanism For Read To Share Transactions in A NUMA Mode" by Hagersten, filed concurrently herewith.
16. "Encoding Method For Directory State In Cache Coherent Distributed Shared Memory Systems" by Guzovskiy et al., filed concurrently herewith.
17. "Directory-Based, Shared Memory, Scaleable Multiprocessor Computer System Having Deadlock-free Transaction Flow Sans Flow Control Protocol" by Lowenstein et al., filed concurrently herewith.
18. "Maintaining A Sequential Store Order (SSO) In A Non-SSO Machine" by Nesheim et al., filed concurrently herewith.
19. "Node To Node Interrupt Mechanism In A Multiprocessor System" by Wong-Chan, filed concurrently herewith.
20. "Deterministic Distributed Multicache Coherence Protocol" by Hagersten et al., filed Apr. 8, 1996, Ser. No. 08/630,703.
21. "A Hybrid NUMA Coma Caching System And Methods For Selecting Between The Caching Modes" by Hagersten et al., filed Dec. 22, 1995, Ser. No. 08/577,283.
22. "A Hybrid NUMA Coma Caching System And Methods For Selecting Between The Caching Modes" by Wood et al., filed Dec. 22, 1995, Ser. No. 08/575,787.
23. "Flushing Of Attraction Memory In A Computer System" by Hagersten et al., filed concurrently herewith.
24. "Efficient Allocation Of Cache Memory Space In A Computer System" by Hagersten et al., filed concurrently herewith.
25. "Efficient Selection Of Memory Storage Modes In A Computer System" by Hagersten et al., filed concurrently herewith.
26. "Skip-level Write-through In A Multi-level Memory Of A Computer System" by Hagersten et al., filed concurrently herewith.
27. "A Multiprocessing System Configured to Perform Efficient Write Operations" by Hagersten, filed concurrently herewith.
28. "A Multiprocessing System Configured to Perform Efficient Block Copy Operations" by Hagersten, filed concurrently herewith.
29. "A Multiprocessing System Including An Apparatus For optimizing Spin-Lock Operations" by Hagersten, filed concurrently herewith.
30. "A Multiprocessing System Configured to Detect and Efficiently Provide for Migratory Data Access Patterns" by Hagersten et al., filed concurrently herewith.
31. "A Multiprocessing System Configured to Store Coherency State within Multiple Subnodes of a Processing Node" by Hagersten, filed concurrently herewith.
32. "A Multiprocessing System Configured to Perform Prefetching Operations" by Hagersten et al., filed concurrently herewith.
33. "A Multiprocessing System Configured to Perform Synchronization Operations" by Hagersten et al., filed concurrently herewith.
34. "A Multiprocessing System Having Coherency-Related Error Logging Capabilities" by Hagersten et al., filed concurrently herewith.
35. "Multiprocessing System Employing A Three-Hop Communication Protocol" by Hagersten, filed concurrently herewith.
36. "A Multiprocessing System Configured to Perform Software Initiated Prefetch Operation" by Hagersten, filed concurrently herewith.

37. "A Multiprocessing Computer System Employing Local and Global Address Spaces and Multiple Access Modes" by Hagersten, filed concurrently herewith.

38. "Multiprocessing System Employing A Coherency Protocol Including A Reply Count" by Hagersten et al., filed concurrently herewith.

BACKGROUND OF THE INVENTION

1. Field of the Invention

The present invention relates to memory management of shared memory in a multiprocessor computing system. More particularly, the present invention relates to a software mechanism for memory address translations from virtual addresses to local physical addresses or remote physical addresses in the multiprocessor computing system.

2. Description of Related Art

In conventional multiprocessor computing systems, application and system software access memory through the use of virtual addresses. The computing system maintains a page table which maps a given virtual address to a corresponding physical address (i.e., the location of where the data actually resides in memory). Data can generally be accessed from either a local memory or a remote memory, depending on the physical location of the data in the memory of the computing system.

Nodes in the multiprocessor system consist of multiple central processing units (CPUs) and memory, and are connected to the other nodes in the system through a system bus or network. The system bus is used to transfer address and data information from one node in the multiprocessor computing system to another node. In this manner, the memories associated with any single node can be accessed, shared, and utilized by other nodes in the system.

However, there are performance drawbacks in accessing memory "remotely", wherein a node reads or writes data stored in the memory of another node in the multiprocessor computing machine. In particular, an access to memory maintained remotely within another node is substantially slower than an access to the memory contained locally in the node. Computing systems and machines with such non-uniform memory access characteristics are referred to as NUMA systems.

In order to improve the performance associated with remote memory accesses, an attraction memory, such as a memory cache, can be maintained as local memory in each node. The attraction memory can store "replicas" of pages of memory which are remotely accessed by the node containing the attraction memory. A hardware device which allows the use of local memory pages as an attraction memory is described in the above referenced related applications, "A Hybrid NUMA Coma Caching System And Methods For Selecting Between The Caching Modes" by Hagersten et al., filed Dec. 22, 1995, Ser. No. 08/577,283; and "A Hybrid NUMA Coma Caching System And Methods For Selecting Between The Caching Modes" by Wood et al., filed Dec. 22, 1995, Ser. No. 08/575,787. This device automatically ensures the coherency between the contents of the remote memory and the local attraction memory.

However, conventional page tables in multiprocessor computing systems do not generally map virtual addresses to the local memory pages of an attraction memory for data which has been replicated locally at a given node. Without such mapping, the performance benefits offered by such a hardware "replicating" device cannot be fully realized by the multiprocessor computing system However, modification of the system's page table to remap the virtual to physical addresses is undesirable, as this would entail substantial changes to the system's operating system What is needed is a mechanism to establish and permit efficient remote memory accesses which will operate within a multiprocessor computing machine without modification of the application software and without modification of the operating system's conventional page table structure

SUMMARY OF THE INVENTION

In accordance with this invention, the above problems have been solved by a method of accessing data contained at a local physical memory address of a present node through a virtual memory address. The method maintains a mapping table in the present node of the computing system containing entries mapping a physical page address to a valid local physical address of the present node. The mapping table supplements the page table of the computing system in that the page table is unmodified in structure by the present method.

If the virtual address is present in the global page table, then it is determined if the physical page address corresponding to the virtual page address, is maintained in the present node of the computing system If the physical page address is maintained in the present node of the computing system, then the physical address is passed to a translation look-aside buffer (TLB) of the address translation mechanism so that the local replica of the page of memory, stored locally in attraction memory, is accessed.

If, however, the physical page address, corresponding to the virtual address, is not maintained in the present node, then the method sets up to remotely access the page of memory at a remote physical page.

Remote access to the page of memory is achieved through determining if the physical page address has been entered in the mapping table with a valid local physical address corresponding thereto. If so, the data at the valid local physical address is accessed by loading the local physical address into the TLB. Under this circumstance, the remote data has already been replicated locally in the attraction memory (local cache), and the local copy of the information is accessed, thereby preventing an unnecessary remote data access, thereby improving system performance.

If the physical page address has not been entered in the mapping table with a valid local physical address corresponding thereto, then it is determined if the data located at the physical page address should be replicated in the present node.

If the data located at the physical page address should not be replicated in the present node, then the data is remotely accessed. Otherwise to replicate the data, a new page of attraction memory is allocated as a replica of the original page of memory. The hardware is further setup and the physical address of the replica is stored in the present node's attraction memory. A valid entry is made in the mapping table mapping the global physical address to the local physical address for optimum system performance on the next access to the data contained at the virtual address mapped by the page table and the mapping table to the local physical attraction memory address.

The above computer implemented steps in another implementation of the invention are provided as an article of manufacture, i.e., a computer storage medium containing a computer program of instructions for performing the above-described steps.

In a machine implementation of the invention, an apparatus for efficiently accessing data contained at physical addresses given a virtual address comprising a table maintenance module, a scanning module, a remote access module, and a replication module.

A table maintenance module creates and maintains mapping table in the present node of the computing system containing entries mapping a physical page address to a valid local physical address of the present node. The mapping table supplements the page table of the computing system in that the page table is unmodified in structure by the present method.

A scanning module determines whether the virtual address is contained in either the global page table and/or the current node. If the virtual address is present in the global page table, then the scanning module determines if the physical page address corresponding to the virtual page address, is maintained in the present node of the computing system.

If the scanning module determines that the physical page address is maintained in the present node of the computing system, then the physical address is passed to a translation look-aside buffer (TLB) of the address translation mechanism so that the local replica of the page of memory, stored locally in attraction memory, is accessed.

If, however, the scanning module determines that the physical page address, corresponding to the virtual address, is not maintained in the present node, then a remote access module prepares to load the page of memory at a remote physical page.

The remote access module accesses the page of memory by determining if the physical page address has been entered in the mapping table with a valid local physical address corresponding thereto. If so, the data at the valid local physical address is accessed by loading the local physical address into the TLB.

If the remote access module determines that the physical page address has not been entered in the mapping table with a valid local physical address corresponding thereto, then it determines if the data located at the physical page address should be replicated in the present node. If the data located at the physical page address should be replicated in the present node, then a replication module remotely accesses the data. The replication module allocates a new page of attraction memory as a replica of the original page of memory. The hardware is further setup and the physical address of the replica is stored in the present node's attraction memory.

The table maintenance module then creates a valid entry in the mapping table mapping the global physical address to the local physical address for optimum system performance on the next access to the data contained at the virtual address mapped by the page table and the mapping table to the local physical attraction memory address.

The great utility of the invention is that all applications and system software using virtual addresses can quickly access remote data which has been locally replicated, and thereby realize the performance benefits associated with local replication.

Another utility of the invention is that the conventional page table structure is not altered or otherwise modified.

The foregoing and other features, utilities and advantages of the invention will be apparent from the following more particular description of a preferred embodiment of the invention as illustrated in the accompanying drawings.

DETAILED DESCRIPTION OF PREFERRED EMBODIMENTS

The embodiments of the invention described herein are implemented as logical operations in a computing system. The logical operations of the present invention are implemented (1) as a sequence of computer implemented steps running on the computing system and (2) as interconnected machine modules within the computing system. The implementation is a matter of choice dependent on the performance requirements of computing system implementing the invention. Accordingly, the logical operations making up the embodiments of the invention described herein are referred to variously as operations, steps, or modules.

Figure 1:
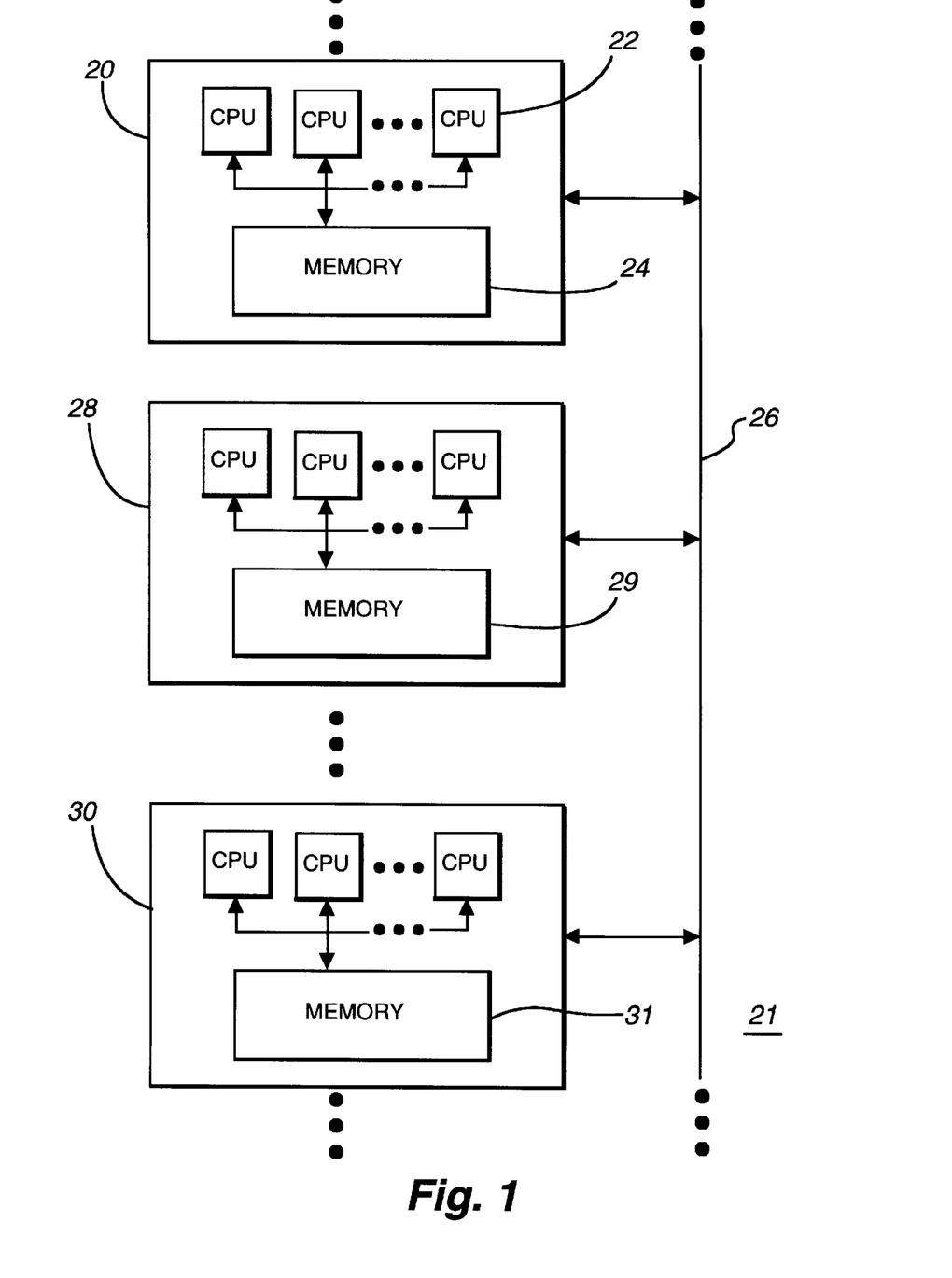
FIG. 1 illustrates multiple computing nodes connected by a system bus or network in a multiprocessor computing machine.

FIG. 1 shows a multiprocessor computing machine 21. Node 20, comprised of a plurality of CPUs 22 and associated memory 24, is connected to bus or network 26 so that node 20 can communicate and share data with the other nodes, such as nodes 28 and 30, in the computing machine 21.

Assuming that the multiprocessor computing machine 21 shown in FIG. 1 utilizes shared memory, then the computing machine's physical memory is composed of the sum of the memory available at nodes 20, 28, and 30. Hence, node 20 can access data over bus or network 26 in memories 29 and 31, in addition to its own memory 24.

Figure 2:
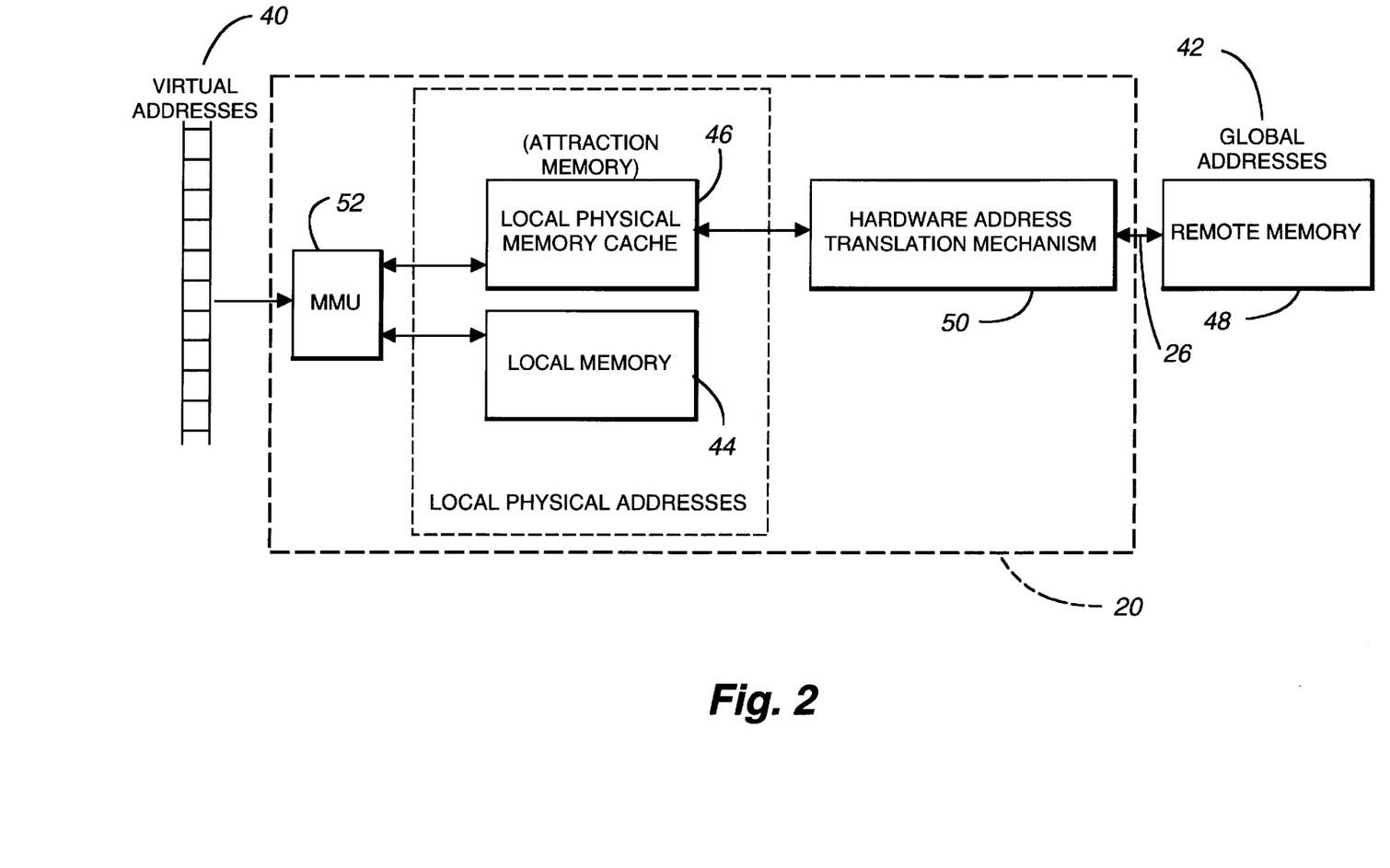
FIG. 2 illustrates a block diagram of the present invention wherein a single node 20 translates virtual addresses to global addresses of a remote memory located in another node.

FIG. 2 shows a block diagram of the environment of the present invention. Node 20 is shown connected through bus or network 26 to remote memory 48. Node 20 processes virtual addresses 40 and services the data requests having virtual addresses within either local memory 44, attraction memory 46, or remote memory 48. Remote memory 48 is addressed by global addresses 42.

Node 20 has a memory management unit (MMU) 52 which processes incoming data requests. The memory of node 20 is partitioned by software into two regions, referred to herein as "local memory" 44 and "attraction memory" 46. Attraction memory 46 is used to store local replicas of data items obtained from remote memory 48. As described above, the proper use of attraction memory 46 can improve the performance of the node's processing of data obtained from a remote memory page.

Each piece of information in the multiprocessor computing system is resident in the local memory 44 (and not in the attraction memory 46) of at least one node in the multiprocessor computing system. This node is referred to hereinafter as the "originating " node. In contrast, a "replicating node" refers to a node which remotely accesses data stored in the memory of an originating node, and locally replicates the data in the attraction memory of the replicating node. While nodes in the system can read, write, or modify data from an originating node, all replicating nodes must take measures to ensure coherency between their replicated versions of the data and the originating node's version of the data.

Hardware address translation mechanism 50 is used within node 20 to locally replicate remote memory by ensuring coherency between the data contained in local attraction memory 44 and remote memory 48 for a given page of memory. Mechanism 50 also translates local physical addresses to global addresses 42, and conversely, translates global addresses to local physical addresses. Hardware translation mechanism 50 is described in detail in co-pending, commonly assigned patent applications "A Hybrid NUMA Coma Caching System And Methods For Selecting Between The Caching Modes" by Hagersten et al., filed Dec. 22, 1995, Ser. No. 08/577,283; and "A Hybrid NUMA Coma Caching System And Methods For Selecting Between The Caching Modes" by Wood et al., filed Dec. 22, 1995, Ser. No. 08/575,787, which have been incorporated herein by reference.

The operating system manages the physical memory of the multiprocessor machine as a global resource available for a variety of purposes such as program execution, caching of data stored on disk, or other internal uses including for use as an attraction memory. Referring to FIG. 2, the physical pages of memory are managed by the operating system through MMU 52 which, using mechanism 50, maps virtual addresses to physical addresses or pages. Software programs operating within the operating system are therefore able to access memory by use of virtual addresses.

When a reference to a virtual address occurs, the virtual address of the data is presented to the MMU. When the virtual address is first presented to the MMU, the MMU has no corresponding physical address with which to map the virtual address. Hence the operating system, through the MMU, must make some association between the virtual address presented and an available physical page of memory is then identified and associated or mapped to the virtual address.

The association made between the virtual and physical addresses can be maintained in a conventional page table stored in the main memory of the computing system. The page table is globally available to all nodes in the system, and the page table contains all mappings of virtual addresses to the physical addresses of the originally stored data.

Conventionally, the operating system maintains the page table and maps a given virtual address to a single physical address for each page of memory on the entire machine. If a node replicates a page of data locally, the page table does not reflect the local physical address of the replicated data within the node. Under the preferred embodiment of the present invention, local physical address containing the replicated page of memory is mapped to the virtual address without any modifications to the structure or content of the page table.

Figure 3:
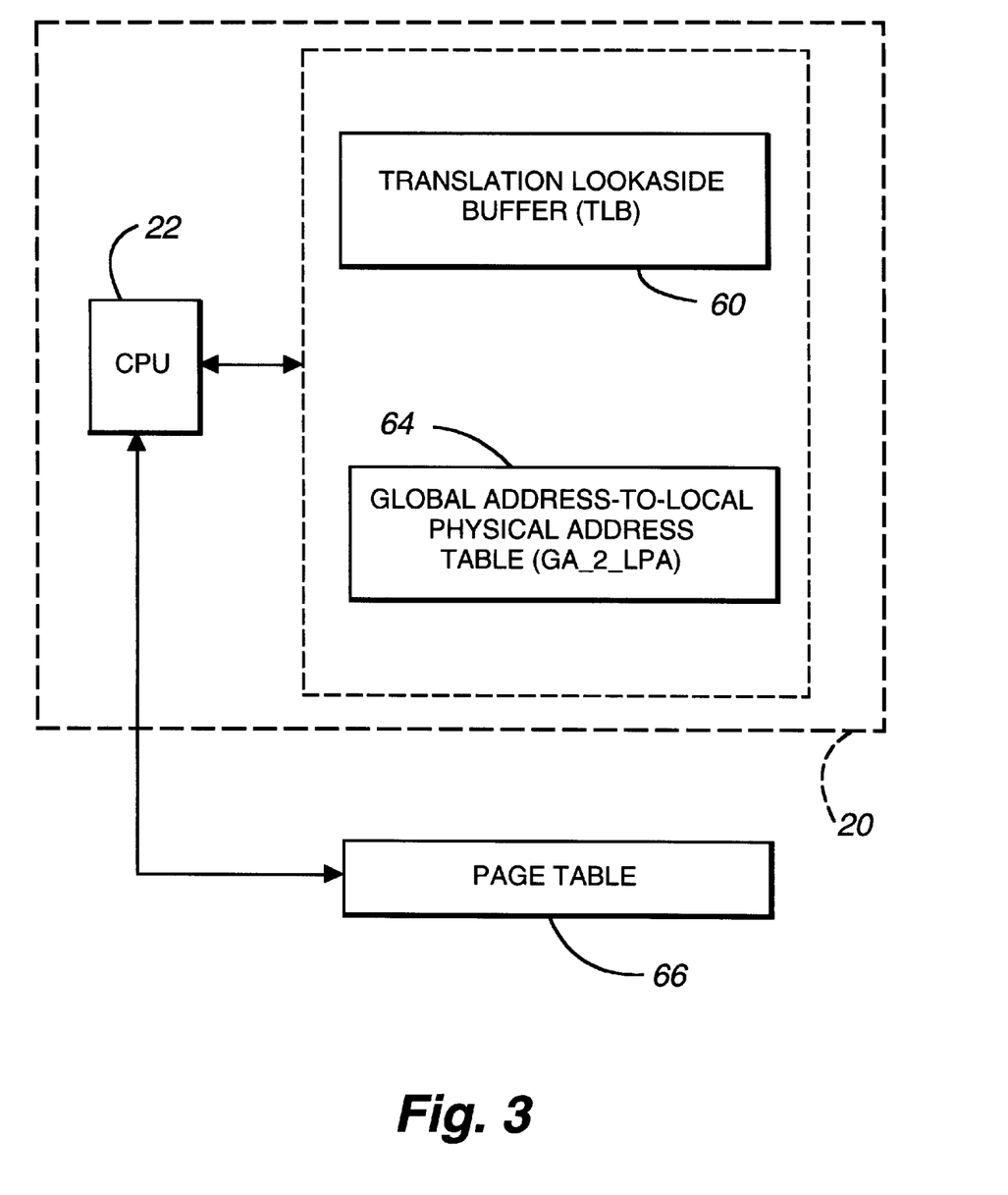
FIG. 3 illustrates a block diagram of the preferred embodiment of the present invention wherein a single node utilizes a translation look-aside buffer, a global address-to-local physical address table, and a page table for address translations.

FIG. 3 illustrates the components used by the preferred embodiment of the present invention. Node 20 has a plurality of CPUs 22 which access translation look-aside buffer (TLB) 60, and global address-to-local physical address table (GA_2_LPA) 64. CPU 22 also accesses page table 66 which is a global table accessible to all nodes in the multiprocessor computing system.

Page table 66, briefly described above, is maintained by the operating system of the multiprocessor machine 21 (FIG. 1), and contains all of the mappings of virtual addresses to physical addresses of the data as stored within the original location in a single "originating" node of the multiprocessor computing system. Page table 66 does not contain any references to the physical addresses or locations of any replicas.

Figure 4:
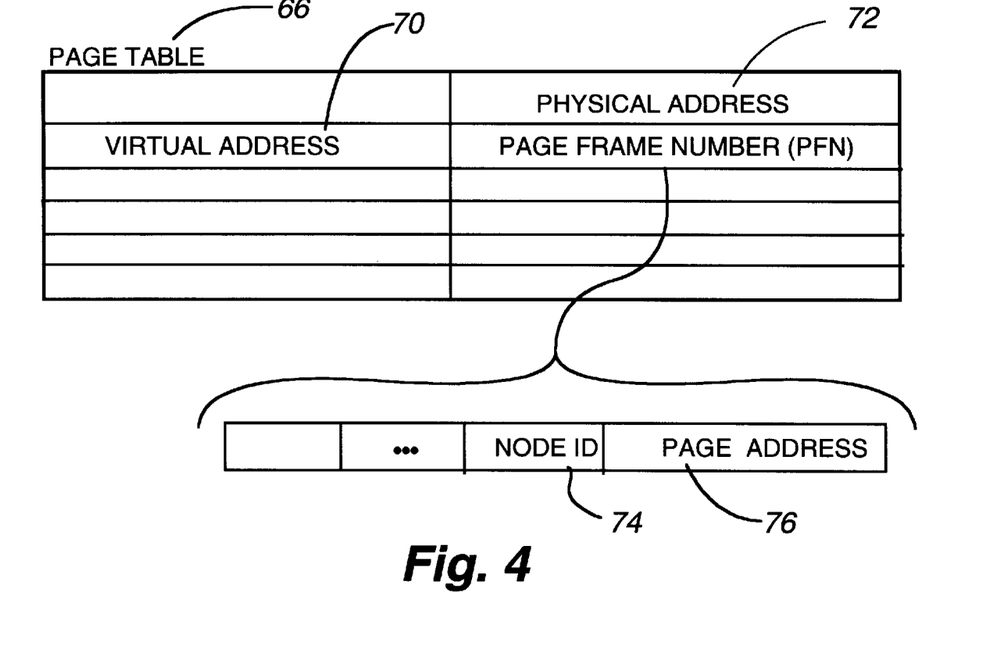
FIG. 4 illustrates the structure of a page table.

FIG. 4 shows the structure of page table 66. Page table 66 has a virtual address column 70 and a physical address column 72, so that a mapping is maintained between virtual addresses and physical addresses. As FIG. 4 indicates, each physical address is composed of a node I.D. 74 and the page address 76. The node I.D. 74 identifies the node from which the data originated ("the originating node"), while the page address 76 points to the physical memory page of the data in the corresponding originating node.

Referring back to FIG. 3, TLB 60 is maintained within hardware address translation mechanism 50 (FIG. 2); the contents of TLB 60 are controllable by external software. As will be explained below, the entries stored in TLB 60, and not the page table, are ultimately used by the MMU to translate virtual addresses to physical addresses where the desired information has been locally replicated. The present invention will alter the contents of the virtual/physical mappings contained in the TLB with physical addresses of replicas stored in the attraction memory of the replicating node. Hence, the TLB and the page table will not contain identical entries for each virtual address. This is in great contrast with conventional memory operating systems, where the TLB is never inconsistent with the page table.

Figure 5:
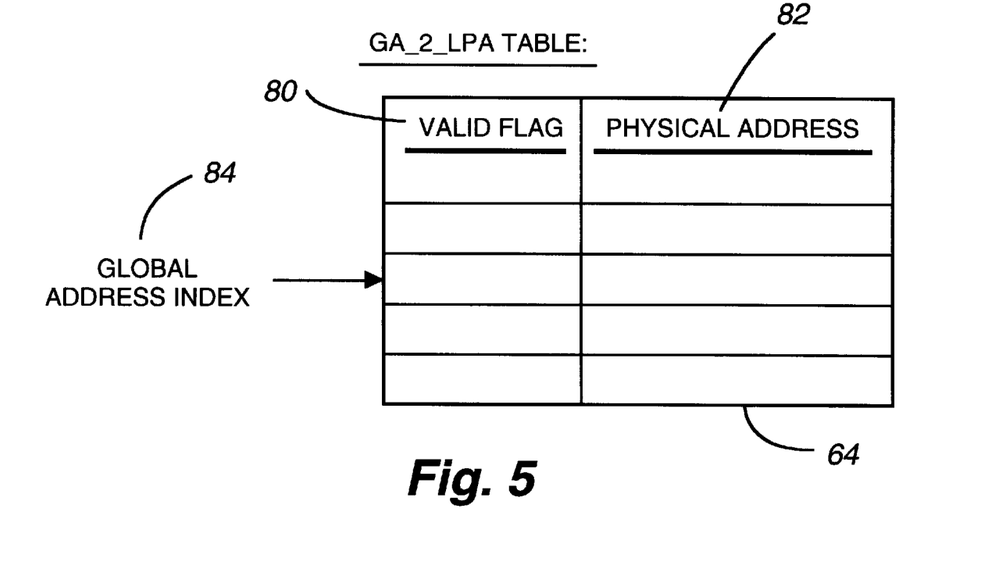
FIG. 5 illustrates the structure of the global address-to-local physical address (GA—2—LPA) table of the preferred embodiment of the present invention.

FIG. 5 illustrates the structure of the global address-to-local physical address table 64 shown in FIG. 3. As with TLB 60, table 64 is maintained within each node of the multiprocessor system by the respective hardware address translation mechanism 50. As FIG. 5 illustrates, table 64 has a valid flag column 80 and a physical address column 82.

The GA_2_LPA table 64 maps the global physical address of the original page of memory to either itself if the original page has not been replicated locally in the present node, or to the physical address of the page as replicated on the present node. The valid flag field column 80 is used to indicate to the hardware address translation mechanism 50 (FIG. 2) where from to access memory. If the flag is 0, then the entry within the table is an invalid entry at this time. In other words, the local replica of the remote memory page is not yet coherent with the remote memory page, as in the first time the remote memory page is accessed on this node. If the valid flag is 1, then the local replica of the remote memory page is coherent with the remote memory page, and therefore the local replica page can be confidently used without having to access the remote memory page.

Figure 6:
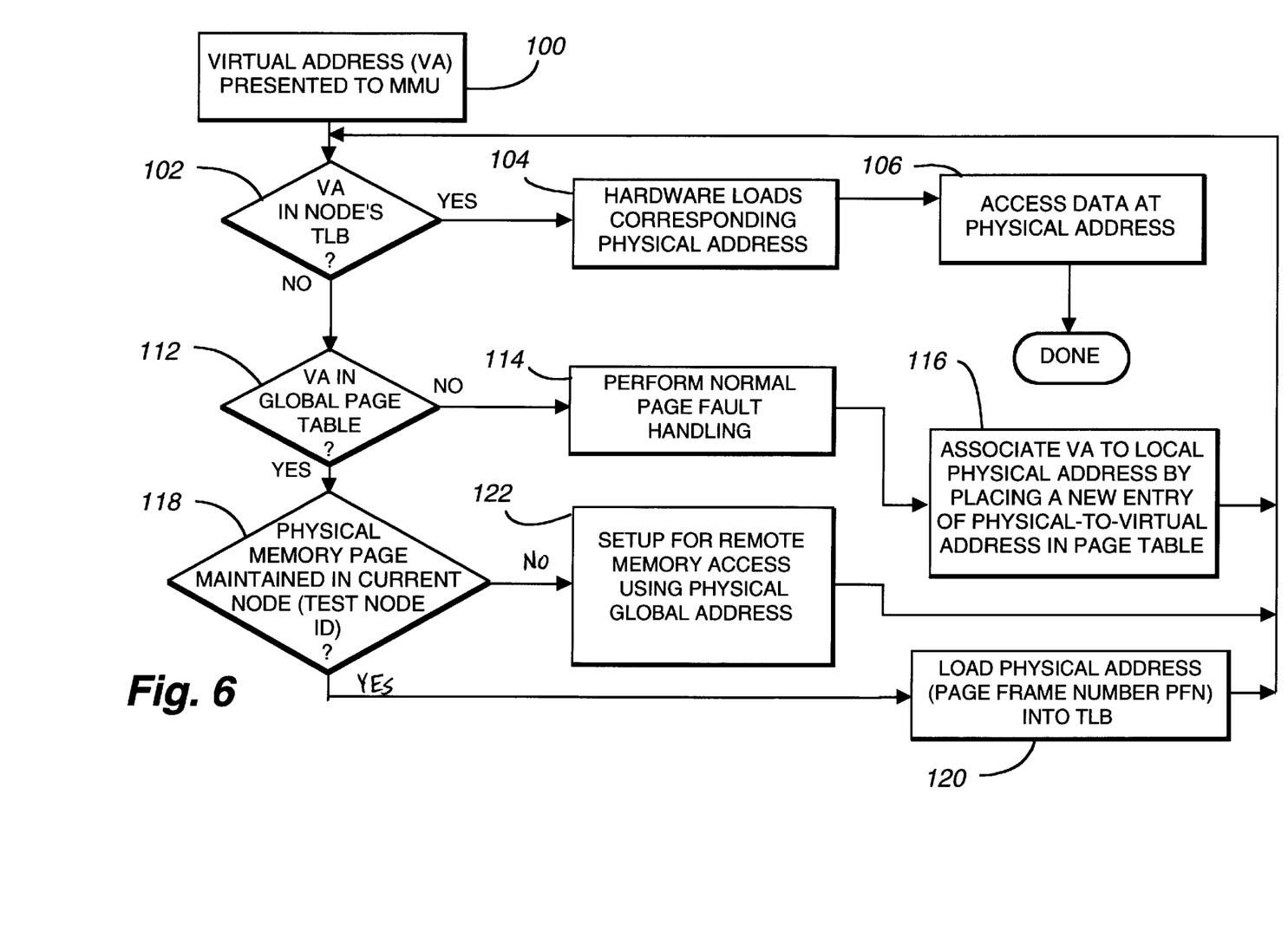
FIG. 6 illustrates the logical operations for translating a virtual address to a global address by the preferred embodiment of the present invention
Figure 7:
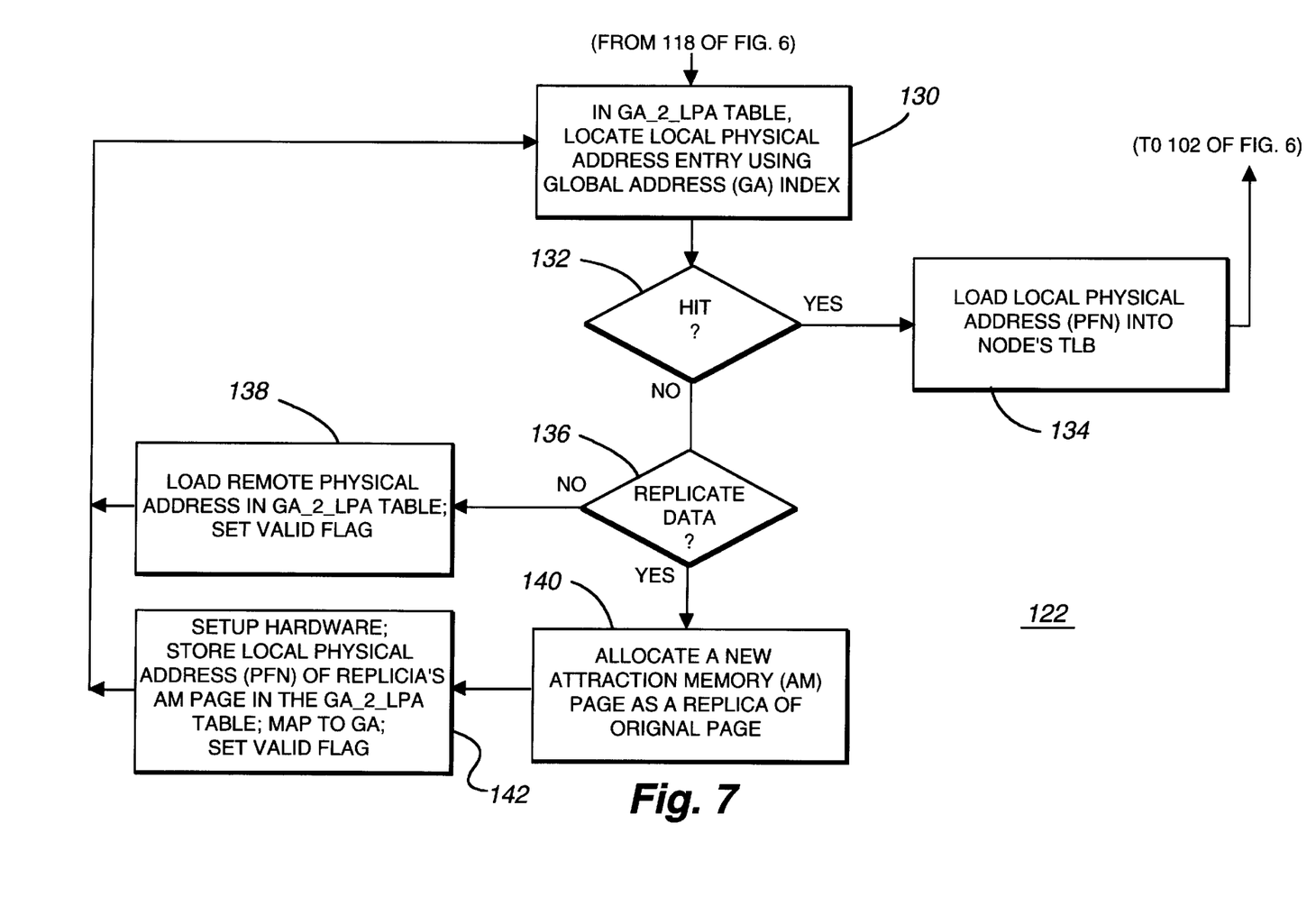
FIG. 7 illustrates the logical operations of setting up to perform a remote memory access using a global address in accordance with the preferred embodiment of the present invention.

The table is indexed using global address index 84, as will be described in greater detail below. The table therefore maps the global physical addresses to the physical addresses within a single node in the multiprocessor computing system FIGS. 6–7 illustrate the logical operations of a preferred embodiment of the present invention. The virtual address is presented to the MMU (FIG. 2) in operation 100. As previously described, the present invention locates any association between a virtual address and the corresponding physical address, and if no association is found, an association is created.

Decision operation 102 searches the present node's translation look-aside buffer (TLB) for an entry matching the virtual address. If there is a hit, then operation 104 loads the physical address mapped in the TLB to the virtual address, and operation 106 accesses the data at this physical address. Operation 106 completes the entire process by providing the desired data, located at the physical address, to the process which provided the virtual address at operation 100.

If the virtual address is not present in the node's TLB, then decision operation 112 searches the page table, maintained globally in the computing system, for a matching virtual address. If there is no matching virtual address in the page table, then a page fault has been detected Under these circumstances, since the virtual address is not present in the page table, this means that this virtual address has not been assigned by any node in the computing system, and therefore the present node will be the originating node for the storage of this data.

Operation 114 then handles the page fault using normal page fault handling methods. Operation 116 then associates the virtual address to the local physical address by placing a new entry in the page table. Now all nodes in the computing system can access and share the data stored in the local physical memory of the present node by accessing the correct entry in the page table. When operation 116 is complete, control is returned to operation 102 for subsequent processing.

If decision operation 112 determines that an entry in the page table matches the virtual address provided at operation 100, then decision operation 118 determines if the corresponding physical address/memory page, mapped to the virtual address in the page table, is maintained in the present node. Decision operation 118 is performed by comparing the node I.D. 74 of physical address 72 (FIG. 4) to the node I.D. or number of the present node. If the present node I.D. matches the node I.D. of the physical address, then operation 120 loads the physical address into the TLB of the present node. In this manner, the present node can therefore access quickly the data located at the physical address. Control is then returned to operation 102 for subsequent processing.

If, however, decision operation 118 determines that the physical memory page, corresponding to the virtual address, is not maintained in the present node, then operation 122 will setup to remotely access the memory using the physical address obtained from the page table in operation 112.

FIG. 7 illustrates the logical operations for setting up for access to remote memory according to the preferred embodiment of the present invention. These operations utilize the global address-to-local physical address table 64 shown in FIG. 5 (GA_2_LPA).

Operation 130 uses the global addresses from the page table to index the GA_2_LPA table. Operation 132 determines if the indexed entry has its valid flag set, and if so, the associated physical address may be used to load the TLB by operation 134. This physical address may be a local address, in which case the address represents remote data cached locally in attraction memory, or a remote global address, in which case the remote data has been previously determined as having to be addressed remotely, without local caching. In either case, the physical address found in a valid GA—2—LPA table entry is used to load the TLB, and control is returned to operation 102 (FIG. 6).

If decision operation 132 is true, this means that the data located at the remote memory location has been replicated locally and stored at a local physical address within the present node.Therefore, the virtual address presented to the MMU at operation 100 is now mapped, in the TLB of the present node, to the physical address of the data as stored in the present node.

If decision operation 132 does not find the indexed GA—LPA table entry to be valid, then operation 136 tests if the data located at the remote memory location should be replicated locally within the present node. This decision is a performance issue determined by a decision-maker external to the preferred embodiment of the present invention. For instance, the software operating within the node could make this determination, as could the operating system of the multiprocessor computing system.

If the data stored in the remote memory is not to be replicated locally in the present node, then operation 138 enters the remote physical address is entered in the GA_2_LPA table at the location indexed by the present global physical address. Operation 138 also sets the valid flag of the entry. Control resumes at operation 130 which now finds a valid entry in the GA_2_LPA table, loads the physical address (which in this case is remote) into the TLB, and control is then passed to operation 102 of FIG. 6 for further processing.

If the data stored at the remote memory location is to be replicated within the present node as determined by operation 136, then operations 140–142 accordingly handle the address mappings. Operation 140 allocates a new attraction memory page, maintained locally within the present node, as a replica of the original page of memory which has been remotely accessed. Operation 142 sets up the hardware and stores the local physical address of this attraction memory page in the GA_2_LPA table. The local physical address is mapped to the global address obtained from search 112, and the valid flag in the GA_2_LPA table is then set. Control is passed to operation 130 which locates a valid entry in the GA_2_LPA table, and loads the replica's physical address into the TLB for processing. Control is then passed to operation 102 of FIG. 6.

The local physical address of the replica's attraction memory page is now mapped to the global virtual address of the computing system. In this manner, any subsequent references by the present node to the virtual address have been properly mapped to the local memory location containing the replica of the data stored in the remote memory location.

Figure 8:
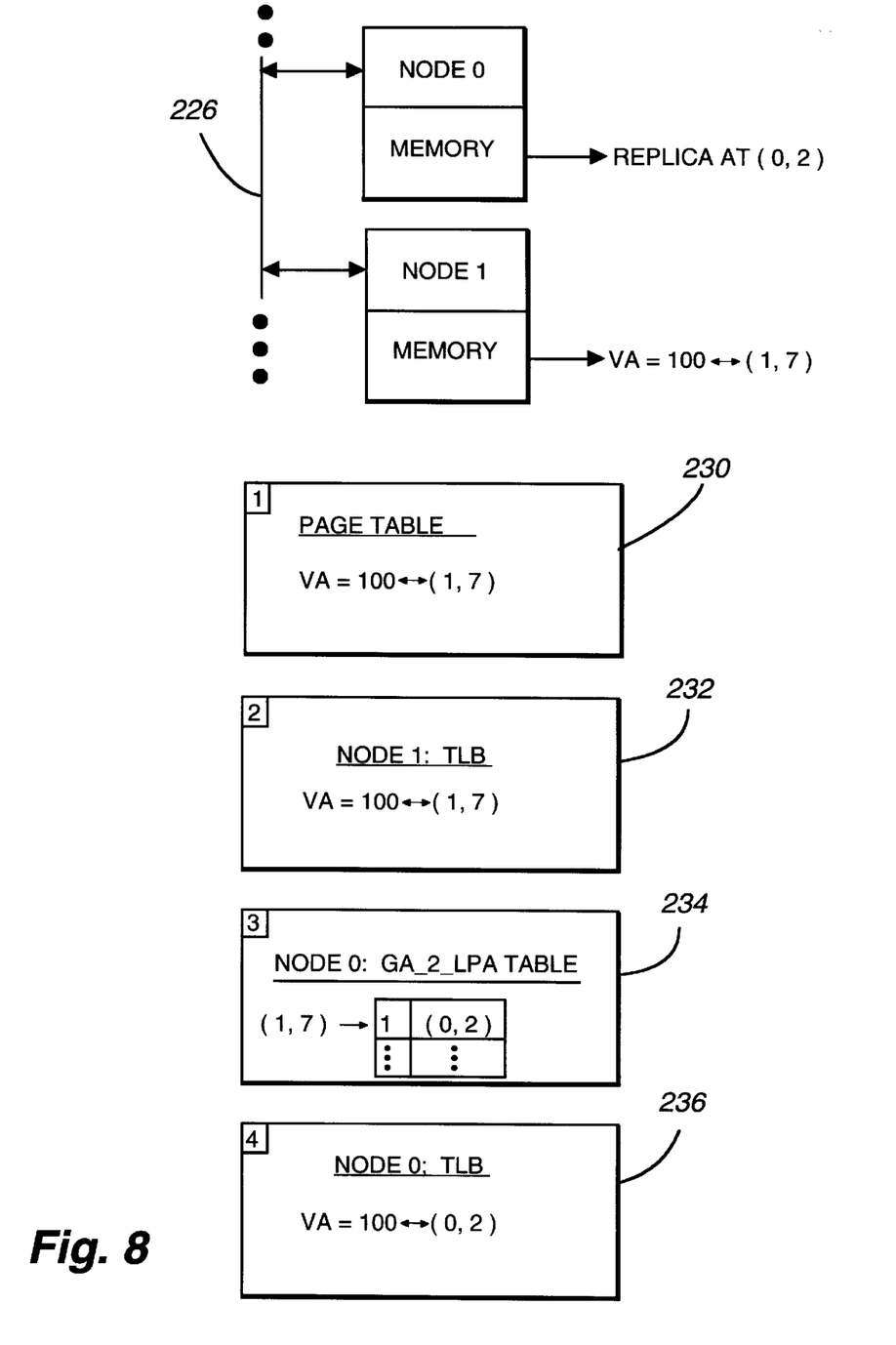
FIG. 8 is an illustrative example of the operations of the preferred embodiment of the present invention wherein node 1 maps a virtual address of 100 to memory page 7 (1, 7); and node 0 remotely accesses node 1, page 7 (1, 7), and replicates this memory page locally at memory page 2 (0, 2)

FIG. 8 illustrates an example of the operation of the preferred embodiment of the present invention. Assuming for purposes of this example, a node 0 and a node 1 are connected through bus 226. Further assuming that in node 1, a virtual address of 100 has been mapped to a local physical address in node 1 at page 7. Further assume that node 0 must process a request for information located at virtual address 100, and that node 0 will replicate the data contained at virtual address 100 to a local address on memory page 2.

Block 230 if FIG. 8 shows that the page table in the multiprocessor computing system will have an entry of a virtual address of 100 mapped to a physical address of page 7 on node 1. This is because node 1 was the originating node of the data contained at page 7 of node 1. According to the present invention, node 1 will therefore also have an entry in its TLB which maps virtual address 100 to node 1, page 7, as shown in block 232.

Assuming that node 0 is to access and replicate the data corresponding to virtual address 100, and further assuming that this replication is to occur at attraction memory page 2 of node 0, then node 0 will allocate an attraction memory page in local memory. Node 0 will then make a new entry in the GA—2—LPA table which will map the global address of (1, 7) to the local attraction memory page address of (0, 2), as shown in block 234. The valid flag of the table will then be set to 1 once the data from the remote memory location of (1, 7) has been copied into the attraction memory at page 2.

Finally, at node 0, the TLB will be updated to contain an entry which maps virtual address 100 to the physical address of (0, 2), thereby pointing to the attraction memory page of the replica of the remote memory page. In this manner, node 0 can efficiently access the data contained at the remote page without having to continually transfer data to and from the bus which connects the node to the remote node.

Therefore, the preferred embodiment of the present invention has mapped the virtual global address to the local physical attraction memory address without affecting either the contents of the page table of the operating system or the operations of the MMU or the hardware address translation mechanism. Efficient and reliable memory translation has therefore been achieved.

While the invention has been particularly shown and described with reference to a preferred embodiment thereof, it will be understood by those skilled in the art that various other changes in the form and details may be made therein without departing from the spirit and scope of the invention.

What is claimed is:

1. In a computing system having a plurality of nodes, each node having a plurality of CPUs, local memory, a memory management unit, and an address translation unit, the computing system having a page table mapping a virtual address to a physical page address, a method of accessing data contained at a local physical address of a present node through a virtual address, the method comprising the computer implemented steps of:

maintaining a mapping table in the present node of the computing system, said mapping table containing entries mapping a physical page address to a valid local address of the present node;

determining if the virtual address is present in the global page table;

first accessing the physical page address corresponding to the virtual address;

detecting if the physical page address of said first accessing step is maintained in said present node of the computing system; and if said detecting step detects that the physical page address of said first accessing step is not maintained in said present node of the computing system, second accessing the physical page address at a remote node through said mapping table; otherwise, third accessing the physical page address at the present node.

2. The method of claim 1, wherein the step of third accessing the physical page address at the present node though said mapping table, further comprises the computer implemented steps of:

determining if the physical page address has been entered in the mapping table with a valid local physical address corresponding thereto; and if so, accessing the data at the valid local physical address.

3. The method of claim 1, further comprising the computer implemented steps of:

determining if the data located at the physical page address should be replicated in the present node;

allocating a page of memory in the present node at a first local physical address for said data;

storing said data in said page; and creating a new entry in the mapping table which maps the physical page address to said first local physical address.

* * * * *